United States Patent [19]
Whitmore

[11] Patent Number: 6,070,165
[45] Date of Patent: May 30, 2000

[54] METHOD FOR MANAGING AND ACCESSING RELATIONAL DATA IN A RELATIONAL CACHE

[76] Inventor: Thomas John Whitmore, 9B Mercury Lane, Newton, Auckland, New Zealand

[21] Appl. No.: 08/998,030

[22] Filed: Dec. 24, 1997

[51] Int. Cl.[7] ................................................ G06F 17/30
[52] U.S. Cl. ........................................ 707/101; 707/103
[58] Field of Search ..................................... 707/101, 103

[56] References Cited

U.S. PATENT DOCUMENTS

| 4,947,320 | 8/1990 | Crus et al. | 707/201 |
| 5,615,362 | 3/1997 | Jensen et al. | 707/103 |

*Primary Examiner*—Thomas G. Black
*Assistant Examiner*—William Trinh
*Attorney, Agent, or Firm*—Jacobson, Price, Holman & Stern, PLLC

[57] ABSTRACT

For an object-based application being executed in a digital computing system a framework is provided for managing information retrieved from a structured database, such as a relational database. The processor is used to construct a single cohesive data structure, called a relational cache, that comprises all the row instances and that represents information retrieval from the structured database in a form suitable for use by one or more applications.

An application may have several of these relational caches active at any one time, some of which may represent separate user editing sessions, where each session may be saved or discarded independently. The framework ensures that only one copy of a row instance is in a given cache at any given time, even if several different queries return the same information from the database. Row instances within the relational cache may be modified by the application, where the row instances are marked as modified but not saved to the database at that time. The framework ensures all modified row instances within the cache are saved at one time, which are presented to the database as a single transaction, with individual rows ordered so as not to violate database referential integrity rules. Other properties of the framework are disclosed.

7 Claims, 7 Drawing Sheets

Diagram of a Computer System in Accordance with the Invention

Diagram of a Computer System in Accordance with the Invention

Diagram Representing the Correspondence Between a Structured Database and a Relational Cache Diagram Representing the Correspondence Between a Structured Database Schema and Row Class Definitions Diagram Illustrating Save with Automatic Row Ordering

FIG. 5
Diagram Illustrating Retrieval Algorithms Considering Current
& Original Primary Key Values Initial State: relational cache contains only blank row Customer Table (fkContact)

| fkContact | sLegalAddr |
|---|---|
| 1 | South St. |
| 2 | Blige Bank Rd |
| 4 | Harris Blvd |

Blank Not in DB: | null | null |
                 | null | null |

Application Request: retrieve Customer (1)                                    ↑ Retrieved Customer Table (fkContact)

| fkContact | sLegalAddr |
|---|---|
| 1 | South St. |
| 2 | Blige Bank Rd |
| 4 | Harris Blvd |

Read from DB into cache →

Blank Not in DB: | null | null |
                 | null | null |

Normal in DB: | 1 | South St |
              | 1 | South St |

Application Request: modify Customer (1), set fkContact = 3,
set sAddr = 'West St'

Normal in DB: | 1 | South St |
              | 1 | South St |

Modify row instance →

Blank Not in DB: | null | null |
                 | null | null |

Normal in DB: | 3 | West St |
              | 1 | South St |

Application Request: retrieve Customer (3)                                    ↑ Key in cache Retrieved Blank Not in DB: | null | null |
                 | null | null |

Normal in DB: | 3 | West St |
              | 1 | South St |

Application Request: retrieve Customer (1)                                    ↑ Row key changed Retrieval error Customer Table (fkContact)

| fkContact | sLegalAddr |
|---|---|
| 1 | South St. |
| 2 | Blige Bank Rd |
| 4 | Harris Blvd |

Found in DB Not read since key in cache as original value →

Blank Not in DB: | null | null |
                 | null | null |

Normal in DB: | 3 | West St |
              | 1 | South St |

FIG. 6
Diagram Illustrating Multi-Step Expressions
Expression starting at Route (1): Distributor^.Contact^.sName
Result : Field sName of Contact (5)
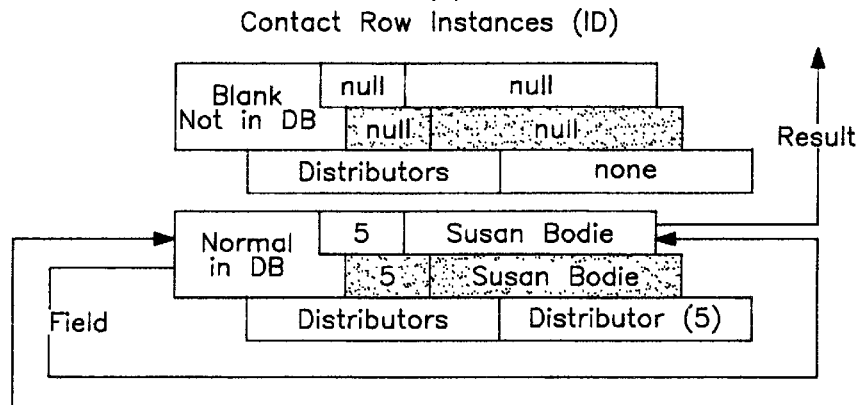
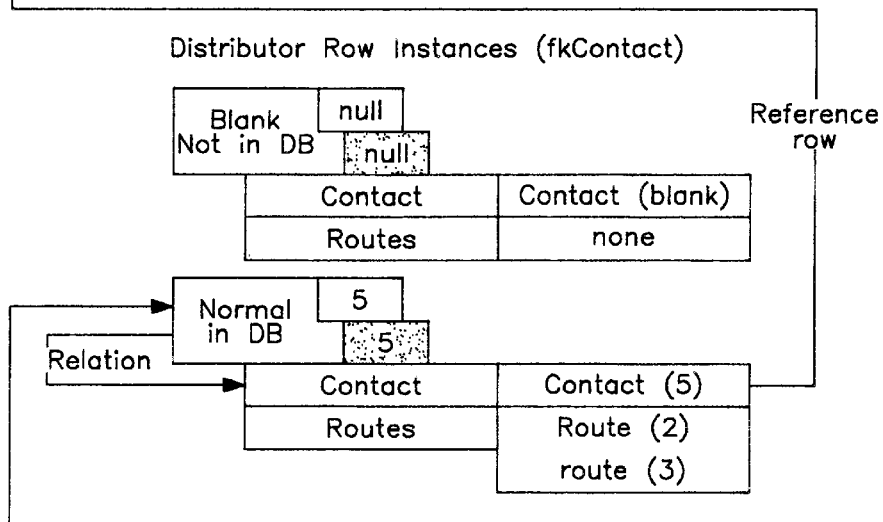
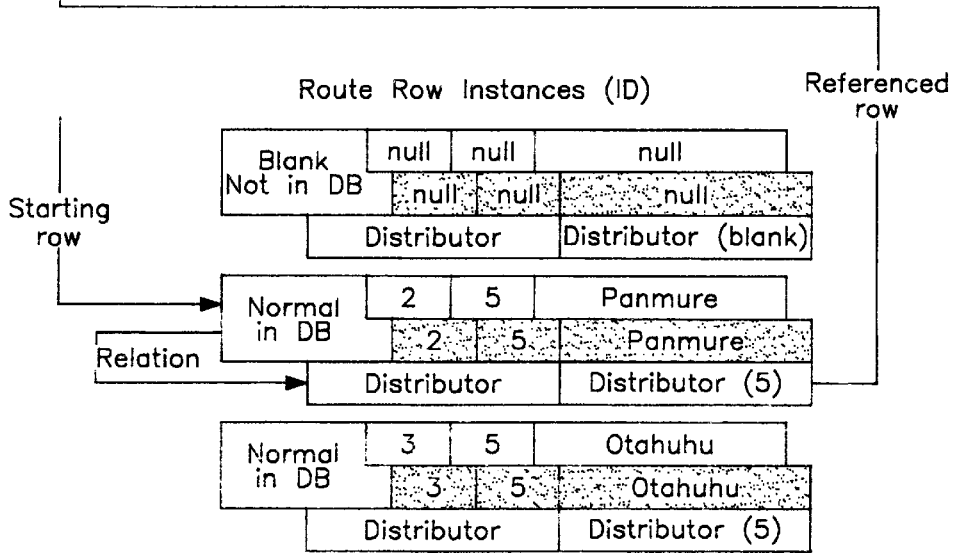

Diagram Illustrating Persistent Expressions
Persistent Expression starting at Route (1): Distributor^.Contact^.sName
Result : Field sName of Contact (5)

METHOD FOR MANAGING AND ACCESSING RELATIONAL DATA IN A RELATIONAL CACHE

FIELD OF THE INVENTION

The invention relates to the interrelationship between databases, particularly relational databases, and graphical user interfaced or object oriented applications.

DESCRIPTION OF THE PRIOR ART AND BACKGROUND OF THE INVENTION

Modern application design methodology, particularly for applications with graphical user interfaces, emphasizes the user being able to perform work in as many independent sessions (often corresponding to windows on a graphical display device) as are convenient, where the changes made in a session are not permanent until the user chooses to make them so.

Relational databases-use the concept of a transaction, which allows changes to be made, without being permanent. In known databases an open transaction may limit or prevent other users from accessing information, involved in that transaction. Transactions require a database connection each, for which a license charge may apply.

It is thus desirable to keep information for each session in temporary storage, and save all changes from temporary storage to the database at one time, protected by a transaction only for the duration of the save. Furthermore, the temporary storage is most useful if managed so that it appears to contain (a possibly modified version of) all information in the database, reading and caching database information when requests are made that cannot be satisfied from information already available in the cache.

Modern database schema design methodology emphasizes avoiding redundant information storage, by normalizing the database schema. Normalized schemas result in information, that users or business logic consider as a whole, being stored in the schema as a row in each of several database tables. Known relational databases allow retrieval from multiple joined tables, but modification only to single tables. For the developer to provide an easily understood user interface, and efficiently implement business logic, a means of accessing any row referenced by a singleton relationship, must be provided, with reasonable default behaviour when a singleton relationship has an empty reference. A means of accessing sets of rows, referenced by set relationships, is also a requirement.

Known systems cache database data in the form of objects, where each object maps to multiple rows in a database. An example is disclosed in U.S. Pat. No. 5,615, 362. The object cache approach has severe problems where two objects partially overlap on a particular row. Modifications which would map to the overlapped row, and should be visible in both objects, are only visible in the object which was directly modified.

Business rules and business processes (collectively referred to as business logic), necessary for the application, may be implemented in the relational database, in the application presentation code, in a middle layer connected by network (physical three-tier), or in a middle layer within the application (logical three-tier). Best practice involves separating the application presentation code from the business logic, to simplify construction and maintenance of the two. Unfortunately development and debugging tools and facilities, available for relational database logic, are poor. This must be programmed using the database vendor's proprietary extensions to SQL, which language was never designed for programming. A middle layer, within the application but separate from the presentation code, can be implemented using powerful development and debugging tools, and does not require separate cache facilities for a physically separate middle layer.

Relationships between rows will change as certain fields of the rows are changed. Application developers must manually detect when relationships have or may have changed, and manually re-query the database, or cache, to update the user interface.

Separate caches involved in separate sessions for the same user, present a possible problem in that different and inconsistent changes may be in the different caches. Much work has gone into some systems in attempting to provide a single coherent cache for the entire application. The inconsistency problem between different caches within one application, is very similar to the inconsistency problem between users on different computers. Both of these problems may be avoided, and concurrent usage maximized, by the use of 'optimistic locking', where each row for modification is identified to the database by all original field values, thus ensuring that other users or cache saves have not modified the row since it was read.

Known relational databases enforce referential integrity, where database operations which would result in references to non-existent rows are prevented. When cached rows are saved to the database, the order in which the rows are saved must be controlled to avoid violating referential integrity. When dealing with two related rows, the order in which they must be inserted is generally the opposite of the order in which they must be deleted.

Developers of database applications spend a large percentage of application development time dealing with the above issues.

SUMMARY OF THE INVENTION

It is an object of the invention to provide a software framework which deals with the issues outlined above and minimises application developer time in addressing them.

In one aspect the invention consists in a software development and run-time framework for structured databases wherein data is stored in rows in each of a plurality of database tables and wherein a database connection established by a user allows selected row instances from the database to be opened by the user and copied to cache memory as row object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

allowing row object instances from multiple tables in said database to be copied to the same cache, recording within each row instance the database table each row instance is associated with, and differentiating between row object instances from multiple tables within the same cache.

In a further aspect the invention consists in a software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

> optimising access to the database by reducing or eliminating queries for data previously copied to cache by detecting in row object instances queried from the database, when a row instance with the same primary keys exists in the cache, using the previously existing row instance and discarding the newly queried row instance thereby preventing duplication of row object instances in the cache.

In a further aspect the invention consists in a software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

> allowing each user to open a plurality of data display and edit forms,
>
> creating a separate cache for each opened form, and
>
> allowing each cache to be saved to the database separately at the user's option.

In a further aspect the invention consists in a software development and run-time time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

> preserving database referential integrity while saving modified row object instances to the database by ordering the saving of the row object instances such that referenced row object instances are created before referencing row object instances, and referencing row object instances are deleted before referenced row object instances.

In a further aspect the invention consists in a software development and runtime framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

> allowing custom written application logic to check and prepare row object instances for saving,
>
> allowing said application logic for any row instance to modify other row object instances which are then not prepared, and so on until all row object instances are prepared for saving.

In a further aspect the invention consists in a software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

> committing row instance changes in said cache after data has been saved to the database by replacing field original values with current values successfully saved to the database,
>
> updating the association between row object instances in the cache and the same row object instances in the database, and
>
> allowing the user to make further changes to selected row object instances in said cache and save again.

In a further aspect the invention consists in a software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

> allowing field data selections from a row instance in the cache to be specified by textual expressions,
>
> allowing said expressions to navigate to singly related row object instances from the previous row, as many times as required,
>
> allowing said expressions to select field data after navigating to related row object instances, and
>
> optimising and reducing queries to the database by processing row relationships within the cache.

In a further aspect the invention consists in a software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

structuring each database row in cache by instantiating separate objects for the row instance, each field of each row, and each relation of each row, detecting and localising changes within these row, field and relation objects, distinguishing whether each change will require the row instance to be updated in the database, optimising updates, reevaluations of persistent expressions and recalculations by performing these only when a relevant localised change occurs.

In a further aspect the invention consists in a software development and run-time framework for structured databases wherein data is stored in rows in each of a plurality of database tables and wherein a database connection established by a user allows selected row instances from the database to be opened by the user and copied to cache memory as row object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement consisting of:

providing a blank row instance for every row type which has blank field values and empty relations, which row instance is not selected or retrieved by or related to normal rows, connecting one-to-one relations which are not related to other rows to a said blank row instance to thereby avoid exception handling and program coding to deal with nil pointers.

The framework according lo the present invention provides multiple independent caches for relational data, allowing updates in the cache before optionally saving. Dynamic navigation of relationships between rows and bound controls to provide an easy user interface are provided. The framework also provides for business logic to be implemented, separated from the user interface.

Applications can have many forms open for editing data, each with its own cache. This gives the ability to save or discard changes in each form independently, without using a transaction for each form.

The framework operates each cache as a virtual representation of the entire database, which may be modified in memory. Any rows desired may be retrieved from the cache, with the framework automatically reading from the database when required.

Simple expressions are used to navigate between related rows, replacing joins (which are not updatable). Bound controls are provided, where fields are specified by expression. These features dramatically simplify the use of multi-table data structures in the database.

Business logic can be defined for each row class and is strictly separated from the user interface. Logic can be executed before saving, when rows are activated in the cache, or be triggered by changes to fields or relations (even of related rows). Relations between rows update automatically as the key/keyed field values change; these fields need not be in the key row/keyed rows, but can be in related rows.

During use of a cache, other database users have full concurrency, since no transactions or database locking are used. Saving a cache is a single operation protected by a transaction, in which all modified rows are sent to the database. Optimistic locking is used to ensure integrity. Locking may occur alternatively at the time of change rather than the time of save.

The technique of row structured observation according to the invention provides for observation of changes to the relational cache. Row instances in the relational cache are structured to contain multiple field instances and multiple relationship instances, these three object types providing complete description of row existence, row values and row instance relationships.

In row structured observation, instances of the three object types provide registration and de-registration methods for interested processes, and notify all registered observer processes when a change occurs within that instance's scope. Multiple processes may observe a single object instance, and a single process may observe multiple object instances.

Row instances also provide overall observation facilities, covering the row instance and its contained field and relation instances. This is provided to reduce resource requirements for user interfaces providing a tabular interface to multiple row instances.

The invention will be better understood by reference to the following detailed description in connection with the accompanying drawings.

BRIEF DESCRIPTION OF THE DRAWINGS

FIG. 5 is a diagram illustrating retrieval algorithms considering current and original primary key values.

FIG. 6 is a diagram illustrating multi-step expressions

DESCRIPTION OF A SPECIFIC EMBODIMENT

Terminology

Figure 1:
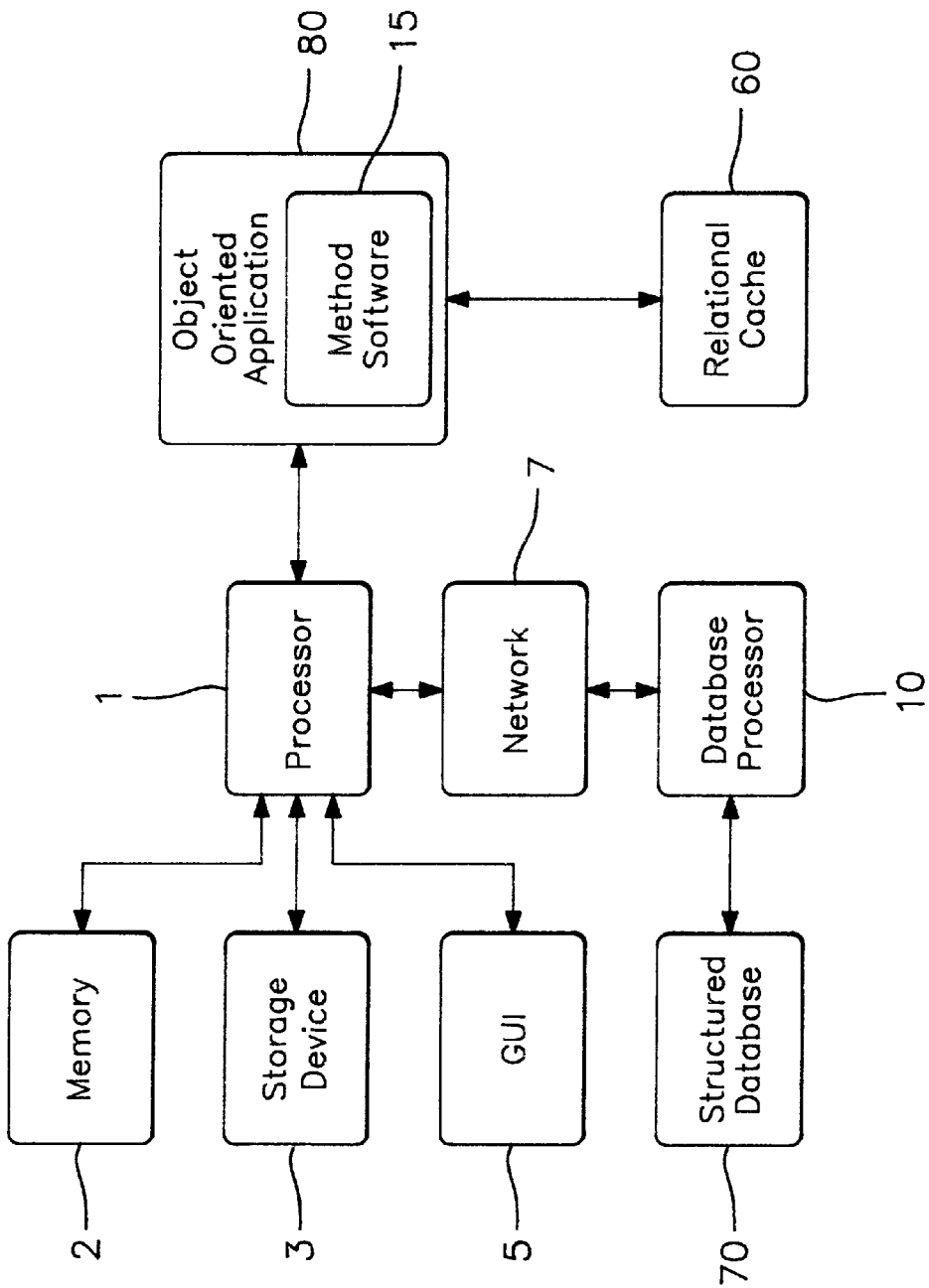
FIG. 1 is a block diagram of a computer system in accordance with the invention.

It will be helpful to the understanding of the present invention to clarify the general meanings of terms of the art which are used in the following description.

Terminology relating to object-oriented systems

Object class—a structure pattern for objects, describing both data storage and methods for data operations.

Object instance—contains stored data, structured according to its object class. Methods described by the object class may be performed upon the instance.

Contained—wholly owned by another object, deallocated (at end of use) by that containing object, and generally accessed through that object.

Object-oriented application—application in which data is structured and manipulated as objects.

Terminology relating to structured databases

Structured database—a database in which data is delimited into fields, each associated with a particular attribute. For example, relational databases structure data into tables, each with columns and rows, and columns are equivalent to fields.

Table—information on a specific class of itern/event/action, organisod into columns for each attribute and rows for each instance.

Rows are collections of attribute values (in fields or columns), cache row generally associated with one specific item/event/action.

Columns—are attributes generally of a class of item/event/action, for which values at tow/column intersections describe each specific item/event/action.

Primary key—a column or several columns, the values of which are used to uniquely identify rows in a table.

Foreign key—a column or columns, identifying related rows in another table.

Database schema—structure and design of a database.

Relationship—an association between rows in two tables, where a correspondence between primary key values in one table and foreign key values in another table causes the rows to be related. May also be a relationship of one table with itself.

Query—a request to the database for information on a row or group of rows.

Transaction—a means of updating the database, where the update must be completed successfully or rolled back in its entirety.

Terminology relating to relational cache

A 'relational cache' is a data structure that comprises one or more row instances used by an object-oriented application. Each row instance maps with one row in the structured database, or does not map with the structured database, depending upon the row class of the instance.

A 'row class' is an object class used to represent rows. Each row class defines a particular structure for row instances, and a particular structured database table or no table. The structure for row instances specifics the creation of named field instances and relation instances, and details for these field and relation instances.

A 'row instance' is an embodiment (instantiation) of a row class. Row instances contain named field instances and relation instances, as defined by the row class. Row instances are differentiated by values contained within their contained field instances.

A 'field instance' is an instantiation of the field class, contained within a row instance. Field instances specify a data type, and contain a single value of that type which could be loaded from or saved to a single row/column intersection in a structured database table. Field instances that do not map to a structured database field, where their containing row instance maps to a structured database table, are allowable and are used to support business logic.

A 'relation instance' is an instantiation of the relation class, contained within a row instance. Relation instances specify the cardinality of the relation (one-to-one or one-to-many), the row class of related rows, persistent expressions of the containing row and optional constants, the row class of related rows, and expressions of the related rows.

'Navigate' means to follow a one-to-one relation to the referenced row, or a one-to-many relation to a set of referenced rows.

A 'blank row instance' is a special row instance not represented in the structured database. The relational cache holds one blank row instance for every row class within the relation cache. It is used as the result of navigating one-to-one relations where a single referenced row does not exist. To fill this role, all field instance values are Null, all one-to-one relation instances return blank row instances, and all one-to-many relation instances return empty sets.

An 'expression' is a text string used to specify a row instance, field instance, or relation instance. Evaluated starting from a specified object (row, field, or relation), multiple expression terms specify named contained objects (fields or relations) or navigation of one-to-one relations to referenced rows.

A 'persistent expression' is an object, used in association with another object or process. With a specified start object and expression, it will evaluate and return a result object. If the result object or navigated relations change after evaluation, the owning object or process is notified.

System Overview

FIG. 1 illustrates a digital computing system suitable to implement the method of the present invention in a typical embodiment. The system comprises computing hardware and related system software that together support the execution of method software, which is software that carries out the steps of the method of the invention. More particularly, the system of FIG. 1 comprises a processor 1 that is coupled to memory 2, a storage device 3 (such as a hard disk), and a user interface such as a graphical user interface 5.

The processor can also be coupled to one or more structured databases comprising software and associated data. In the illustrated embodiment there is one structured database 70. Structured database has its own associated hardware including a database processor 10 which communicates via network 7 with processor 1. In other embodiments the structured database is a software entity that is executed by processor, and network is not present. It will be appreciated by those of skill in the art that a wide range of computing system configurations can be used to support the method of the present invention including, for example, configurations that employ multiple processor and multiple databases.

Method software 15 is incorporated in the object-oriented application 80 which is executed by processor 1. Method software implements capabilities for mapping between structured database 70 and relational cache 60. In particular, method software processes requests from object-oriented application 80 to retrieve information from structured database 70 and map that information into relational cache 60; to navigate relationships between rows in relational cache; to edit rows in relational cache; to create rows in relational cache; to delete rows in relational cache; to store relational cache changes by mapping information to structured database.

To simplify and speed application development, method software provides the object-oriented application with means of defining automatic field value calculation, and user interface control classes which access the relational cache.

Method software uses the described technique of row structured observation in performing many of the requests.

Method software stores information in a relational cache 60 or caches.

The method uses pointers between row instances in relational cache to follow relations between rows rapidly in response to requests from object-oriented application. Using the relational cache, the method reduces the number of queries sent to structured database, thereby increasing performance. Relational cache can be stored in memory, in storage device, or in some combination of memory and storage device. Typically, access to relational cache is much faster than access to structured database.

Object-oriented application may use multiple relational caches, which function independently. It will be appreciated that in some embodiments additional object-oriented applications beside object-oriented application 80 can share relational cache 60.

Mapping From Structured Database to Relational Cache

Figure 2:
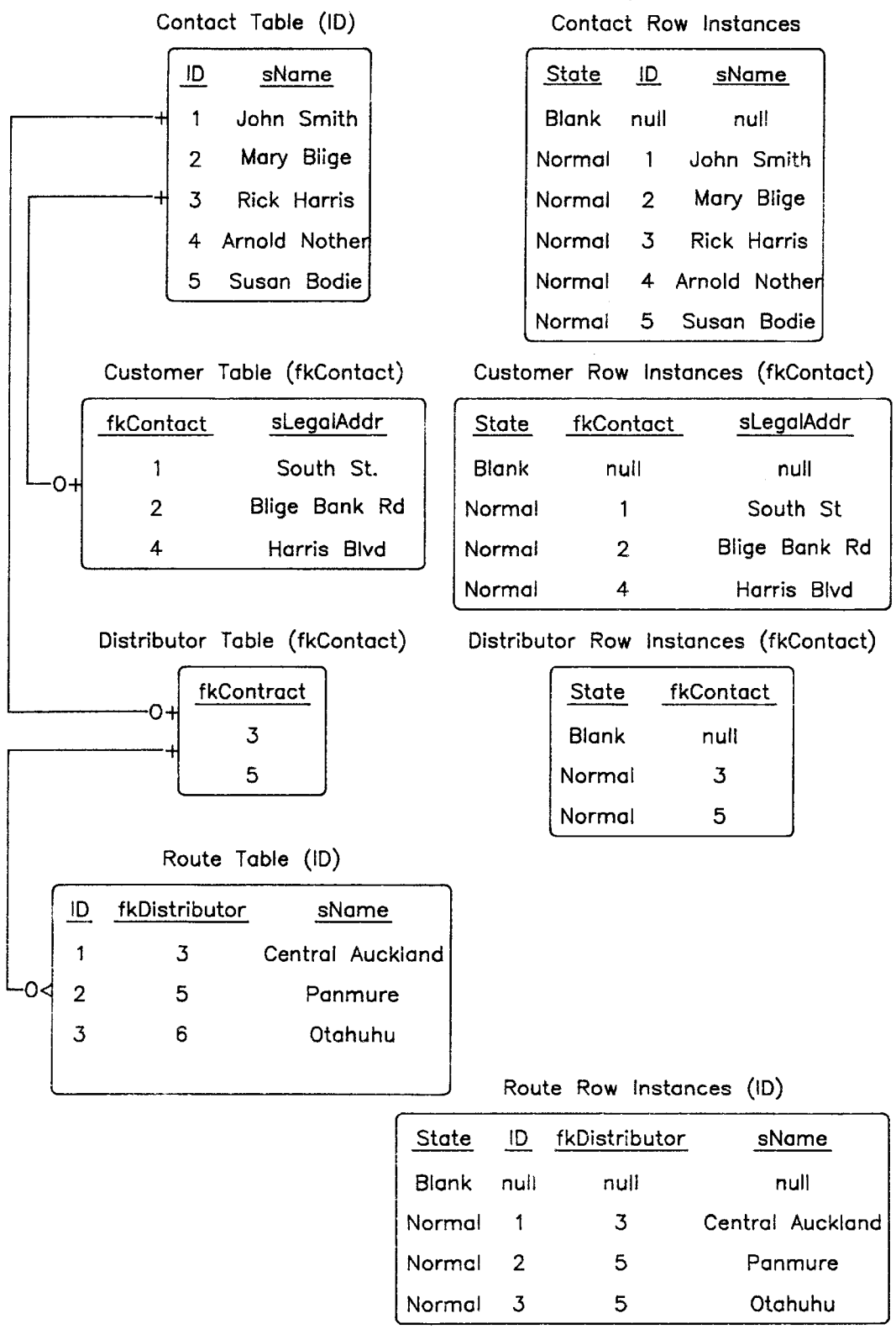
FIG. 2 is a schematic diagram representing the correspondence between a structured database and a relational cache.
Figure 3:
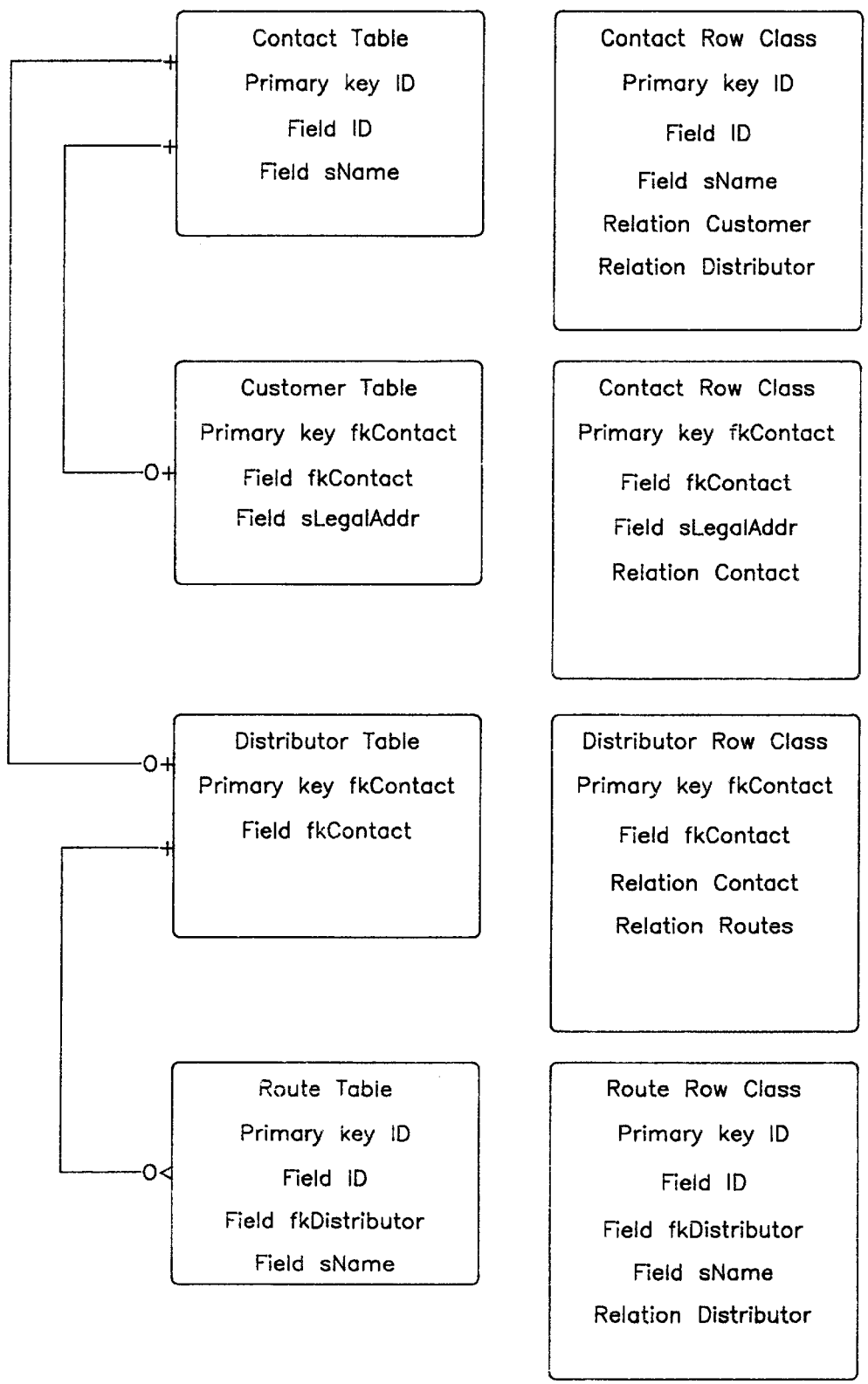
FIG. 3 is a schematic diagram representing an example of a mapping between a database schema and a row instance structure.
Figure 4:
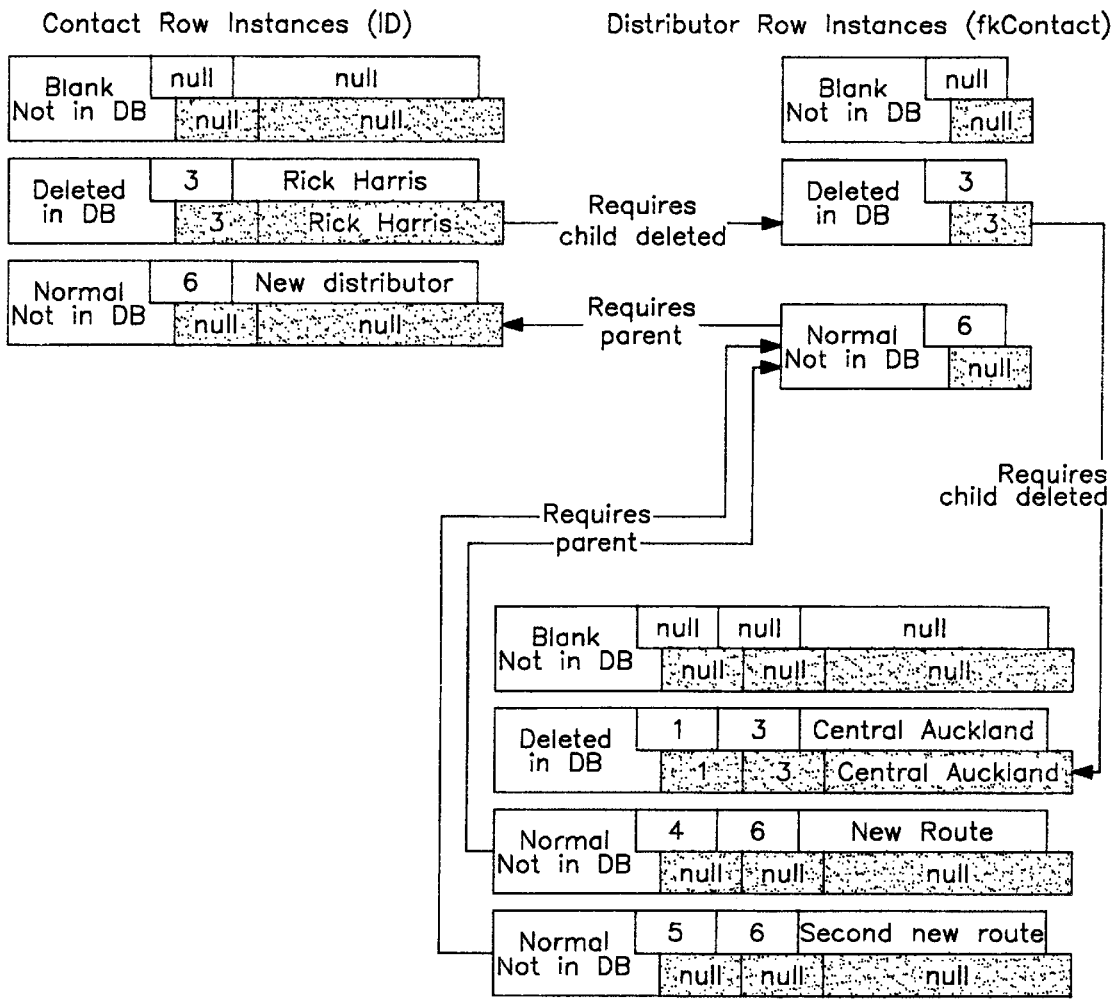
FIG. 4 is a flow chart showing save with automatic row ordering.
Figure 7:
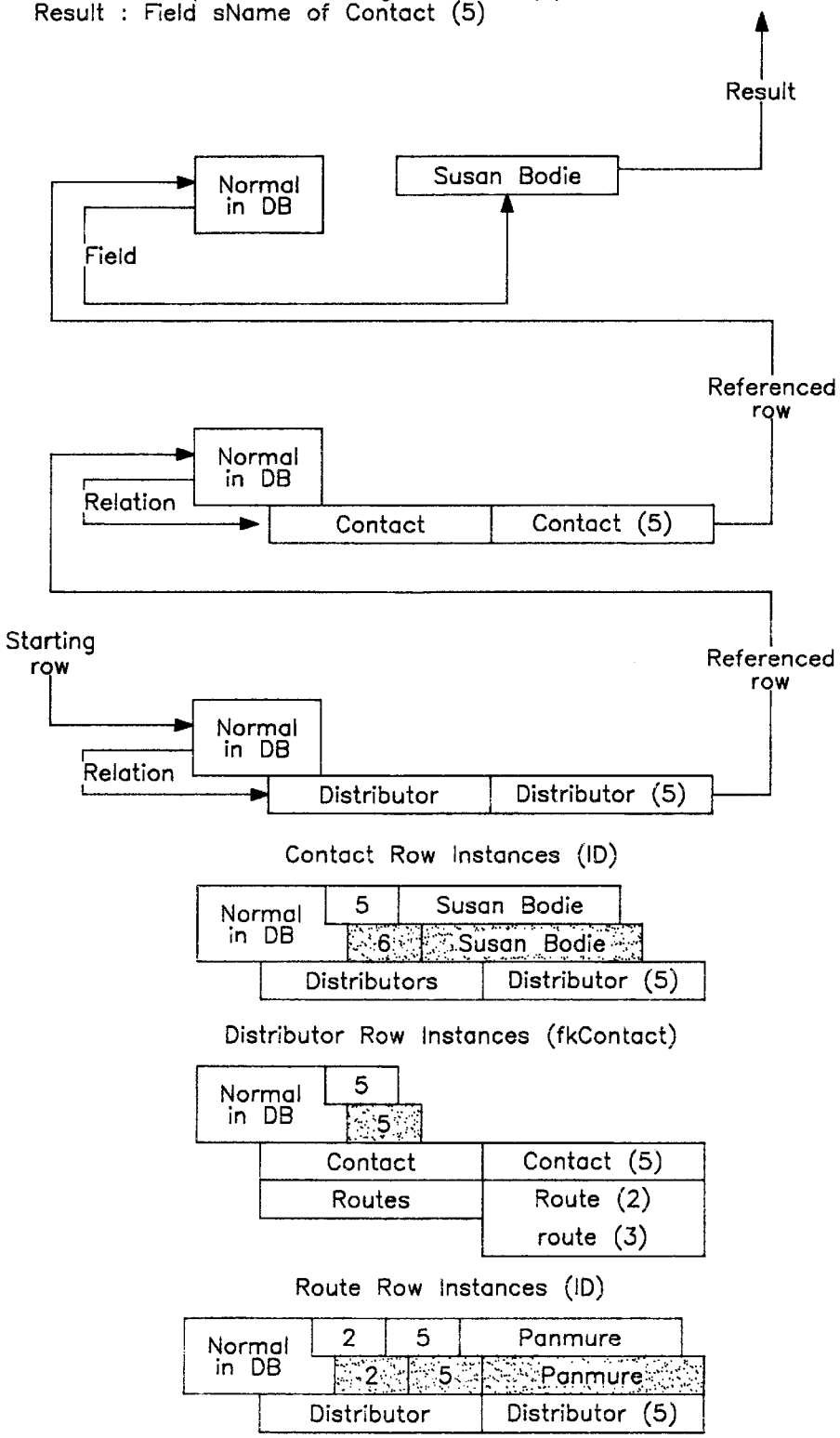
FIG. 7 is a diagram illustrating persistent expressions.

FIG. 2 is a schematic diagram representing the correspondence between structured database 4 and relational cache 5 for an object-oriented application which in this example is a distribution system. Relational cache contains row instances for each row in the database, and blank special row instances of each row class. In this diagram all information in the database has been retrieved into the relational cache; the cache also operates with a partial set of information.

In this example, each row instance can be referenced through a pointer to its memory location. For example Contact (4) and Customer (4) are separate object instances, references to which are maintained by the relational cache.

Each row instance contains (by pointer & ownership) a field instance for each its fields. A field instance may store any value within the scope of its defined type.

For example the Contact field sName stores 'Arnold Nother' for Contact (4) and 'Susan Bodie' for Contact (5).

Each row instance has a primary key value which is a field value or set of field values that uniquely identify that row instance to the structured database. For example the Contact table used the ID field as a primary key, and Contact rows may be uniquely identified using this value.

Each row instance contains (by pointer & ownership) a relation instance for each of its relationships. The relation instance can store a list of references to related rows. For example each Contact row instance contains its own Customer and Distributor relation instances. When Contact (4)'s Customer relation is accessed, the list is generated then stored for future use. For this relation, the list would reference only Customer (4).

Object-oriented application requests retrieval of a row instance by specifying row class and primary key value. Method software performs the following steps:

For example Retrieving Customer (1)
1. Method software searches relational cache for row instance with specified primary keys, returning it if found (searches cache for Customer (1) row instance already existing).
2. If not found, method software searches relational cache for row instance originally retrieved with specified primary keys, raising an exception if found (searches cache for Customer row instance, originally with primary key 1 but now changed).
3. If not found, method software uses row class definition to query structured database to return specified row (querying Customer table in database).
4. Method software creates row instance, contained field instances, and contained relation instances as specified in row class definition. Relation instances are initially in an invalid state where no rows are referenced, and must be made valid when a request for navigation is made (creating Customer row instance in cache).
5. Query fields (row/column intersections) are read into field instances, as specified by row class definition through field instances. Field instances also separately record values as mapped in structured database, to find the structured database row later when saving (reading values from database to Customer row instance).
6. Row instance is activated in relational cache, performing any automatic behaviour such as field calculation.
7. A reference to the row instance is returned to object-oriented application for further processing (reference to Customer row instance).

Navigating Relations between Rows

Relation instances with both one-to-one and one-to-many cardinalities maintain a list of referenced row instances, and a flag indicating whether the list is valid. Relation instances are created in the invalid state. When object-oriented application requests to navigate the relation, a valid list of referenced row instances is required.

Method software performs the following steps:
1. If relation instance has valid list of referenced rows, nothing needs to be done.
2. If not valid and row instance owning relation instance is blank or deleted, method software sets the relation instance as having a valid empty list.
3. Otherwise, method software creates persistent expressions to evaluate relation instance's expressions of the containing row. Later changes to the, or which, field instance results from a persistent expression will be notified to the relation instance.
4. Method software generates a group specifier of referenced row expressions and required values of these expressions (from field values of persistent expressions of containing row and constants).
5. If group specifier has not been previously retrieved from structured database, method software uses row class definition to query structured database to return specified group or superset of specified group. Query rows are instanced in relational cache where no row instance currently with matching primary keys, or originally retrieved with matching primary keys, exists in relational cache.
6. Generates valid list of referenced row instances, by searching relational cache for row instances matching group specifier.
7. Relation instance is registered with relational cache as overall observer of referenced row class instances.

Two different methods of relation navigation exist, dependent upon the cardinality of the relation. One-tone relations, when navigated, result in a single row instance. This is a normal row instance if one and only one is in the list; otherwise a blank row instance.

One-to-many relations are generally navigated by iterating through the set. Method software provides read access to the list of referenced row instances.

Relation instances maintain a valid list of referenced row instances, or flag the list as invalid, in response to relational cache changes. Relation instances notify observing objects or processes when a valid list of referenced rows changes, or is flagged invalid. Method software performs the following steps:
1. Relation instance with valid list of referenced rows has been notified of change to instance of referenced row class.
2. Row instance is tested using previous generated group specifier to determine membership of specified group.
3. If row instance is a member of group but was not in the referenced row list, reference to row instance is added to referenced row list.
4. If row instance is not member of group but was in the referenced row list, reference to row instance is removed from referenced row list.
5. If referenced row list was changed by steps 3 or 4, registered observers of relation instance are notified of change.

Relations update automatically when persistent expressions of the containing row, used to generate the group specifier, notify of expression result changes. When this occurs, method software performs the following steps:

1. Relation instance with valid list of referenced rows has been notified of change in persistent expression result.
2. List of referenced rows is temporarily saved for comparison.
3. List of referenced rows is flagged as invalid, and relation instance is deregistered with relational cache as overall observer of referenced row class instances.
4. Valid list of referenced rows is generated as described above.
5. List of referenced rows is compared with saved comparison list. If there is a difference, registered observers of relation instance are notified of change.

Method software allows object-oriented application to assign a row reference to a one-to-one relation instance's row reference. In this case, field values of the group specifier are extracted from the assigned referenced row instance, and mapped and stored into expressions of the containing row, in a manner inversely similar to making a valid list of referenced row instances.

Editing Rows in Relational Cache

Information in the relational cache is structured into object instances of several classes, of which the field class is used to store and update field values corresponding to row/column intersections in the structured database.

Method software provides access to field instances by means of expression evaluation, typically starting from a row instance. An expression may have any number of terms specifying named contained objects (fields or relations) or navigation of one-to-one relations to referenced rows, but for this purpose must evaluate to a field instance. A reference to the field instance is returned to the object-oriented application for further processing.

Once object-oriented application has a reference to a field instance, method software allows read and write access to the field value either as native data type or text string. Text string is particularly of use for user interface purposes of the application, while native data type is particularly of for programmatic logic purposes.

Field instances maintain their value in both forms simultaneously, which are kept in correspondence excepting invalid text string which are allowed not to correspond to native data in the expectation of further editing to make the text string valid.

Assignments to the field value as text string update the value as native data type immediately, if text string can be converted to valid native data. If a valid conversion is not possible, the invalid text string is accepted but flagged by method software as invalid which prevents method software saving relational cache.

Assignments to the field value as native type update the value as text string immediately, with a conversion of the native data to text. This conversion is always possible.

Creating Rows in Relational Cache

Method software allows creation of instances of any row class. Row class definition specifies automatic initialization of primary key fields, defaulting to an allocator of multi-user unique integer numbers. These primary key field values are also stored in field instances as they would be mapped to structured database.

Since row instances in relational cache are uniquely identified by pointer reference, it is allowable to have multiple instances with identical primary keys. Such situations are even useful for user interface purposes. The method software relies upon the structured database to detect and prevent saving saving non-unique rows; this could easily be checked within the method software.

Created row instances are activated in relational cache, performing any automatic behaviour such as field calculation. Finally they are returned to the object-oriented application for further processing.

Deleting Rows in Relational Cache

Method software allows deletion of row instances in relational cache. For developer convenience, deleted row instances remain in memory, retain their field values, and relate to other row instances. Deleted row instances are not referenced by relation instances. This does produce an assymetrical relation situation; for most purposes, it is most useful and convenient.

Storing Relation Cache Changes by Mapping Information to Structured Database

Object-oriented application may request method software save relational cache at any time. Because of the design goal of operating the relational cache independently of structured database, mapping information from the relational cache to the structured database is fairly complex.

Before the relational cache may be saved, all row instances must be prepared to allow for final business logic processing and checking. Because of possible flow-on effects from preparation business logic, preparation cycles for all row instances must be performed until a cycle completes without changing any row instances.

Since structured database or relational cache errors may interrupt a save operation, method software provides for object-oriented application to encapsulate the entire save operation within a structured database transaction, which is only committed if no errors occur.

Structured databases may demand that referential integrity be observed at all times. This affects the order in which row instances in the relational cache may be saved. Before saving each row instance, method software checks row's relation instances and saves any unsaved row instances (including deleted row instances) which the relation instance specifies as required for referential integrity.

Method software specifies that another row instance must be saved beforehand to preserve referential integrity where;
1. Other row instance matches relation instance group specifier (deleted row instances included).
2. Other row instance has been changed (field values or existence) in relational cache.
3. Other row instance has not been saved by this save request.
4a. Relation instance specifies 'referenced children' and other row is deleted;
4b. Or relation instance specifies 'referenced parents' and other row is not deleted.

For each changed row instance, of a row class defined as mapping to a structured database table, method software saves row instance to structured database using the following steps:
1. Method software is saving a row instance to a structured database table.
2. Method software queries structured database;
2a. For row instances existing in structured database, generated query searches for all field values as initally read from the structured database, and must find a matching row.
2b. For row instances riot existing in structured database, generated query searches for primary key field values as will be represented in structured database, and must not find a matching row.
3. Depending upon whether row instance exists (isn't deleted) in relational cache, and whether row exists in structured database, method software may delete, begin inserting, or begin updating a row in structured database.
4. For row instances existing in relational cache, method software maps field instance values to structured database as specified by row class definition and ends row insert/ update in structured database.

5. For row instances initially existing in structured database, method software checks that generated query found only one row.

Method software maintains a list of saved rows instances during a save request, which is used to prevent multiple save attempts of a single row instance. When all rows have been saved and the structured database transaction committed successfully, method software commits changes in relational cache as follows:

1. Field instance records of value as mapped in structured database are updated.
2. Row instance flags for existence in structured database are updated.
3. Modified flags are cleared.

Method software's separation of save and commit operations allows object-oriented application to save the relational cache any number of times, as convenient for the developer or user. It also enables any number of unsuccessful saves to be attempted, without preventing a successful save once the problem has been rectified.

Calculated Fields and Programmed Behaviour

Business logic for a row, often depends upon values in related rows. For purposes of logical simplicity and flexibility, it is desirable to be able to pull in these values, rather than require the related rows to push the values across. The persistent expression is a useful tool for method software to perform this task.

Method software allows a row class definition to specify any number of named persistent expressions, and program code to calculating field instance values or perform similar behaviour. This program code is executed by method software when row instances are activated in a relational cache, or when a row instance's persistent expression result has changed. Generally the program code will evaluate or reevaluate some or all of the row instance's defined persistent expressions, and utilize the results of these in performing its programmed behaviour.

Method software also allows field value changes to trigger programmed code via a push system. Each field may trigger multiple change handler routines, simplifying the programming of calculated field value defaults. This is defined in the row class.

Graphical User Interface Controls

To simplify and speed development of graphical user interface to object-applications, method software 3 provides several classes of control for graphical user interface 6. These provide a sophisticated user interface to data, which by simple means involving persistent expressions is accessed and changed in the relational cache 5.

Since an expression requires a starting object (generally a row instance) to evaluate from, method software provides control classes called row sources, which are not a visible part of the user interface but provide a link from visible interface controls to the relational cache.

Each row source control contains a source node object, which references a single row instance, and is used as the start object of persistent expressions for controls using that row source control. The object-oriented application changes the source node's row reference indirectly through the row source's row reference or other methods. When the source node's row reference changes, involved persistent expressions are automatically detected by method software and their owning controls notified.

Method software provides a textual edit control to view and change a field instance's value as a text string. The field instance is specified by reference to a row source and expressions, for persistent use. The expression may navigate any number of one-to-one relations, and for convenience is relative to the row source's referenced row.

Method software also provides a control to select a single related row from a set of related rows. Reference to a row source and two expressions, relative to the row source's referenced row, specify one-to-one (selected row) and one-to-many (set of rows) relation instances. An expression relative to the related row instances is evaluated to display field instance value text strings for the set of rows. The relation instance specifying the set of rows, may be defined in row class definition to include the blank row as an item within the set for the purposes of this control, with a specified text string to display.

Row Structured Observation

Method software relies upon change notifications between objects in relational cache. The technique of row structured observation is allow processes or objects to observe any changes to current visible data in the relational cache. This covers field values, relation references, and row existence but not support information used to maintain and map the relational cache.

Method software provides the following observation systems:

1. Row instance observation, for row normal/deleted/blank status changes.
2. Field instance observation, for field value changes to native data or text string.
3. Relation instance observation, for relation referenced row list changes/invalidation.
4. Row overall observation, covering changes to row and contained fields/relations.

Used to reduce user interface requirements for displaying multiple tows in tabular form.

5. Row class instance observation, covering changes to row and contained fields. Used to maintain relation lists of referenced rows.
6. Row modified flag, covering row changes to rows and contained fields. Flag determines whether row must be saved to relational cache. Method software internally performs observation to maintain this flag, and doesn't offer registration to observe the flag itself.

For application convenience, method software also provides a relational cache modified flag, set if any rows are flagged as modified, cleared after a successful save. Provision is made for a single object to observe this flag Layered Caches Applications often offer editing function and processes within an editing window, that require a further dialog for process information. The dialog may be saved (OK button) or cancelled at the user's option. Any changes saved are incorporated into the editing window, but not saved to the database until the editing window is saved Method software supports tentative editing within such dialogs, by means of layered caches. A child cache can be created that references a parent cache, and requested information not in the child cache is then retrieved from or through the parent cache rather than directly from the database. When the child cache is saved, its changes are incorporated into the parent cache.

Method software currently records in each row in the child cache, a reference to the corresponding row in the parent cache. This maps the child cache to the parent cache efficiently, but does not provide any locking scheme saving from the child cache to the parent. For this reason it is most useful when the dialog must be dismissed before further changes in the editing window are possible.

What is claimed is:

1. A software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, the improvement comprising:

allowing custom written application logic to check and prepare row object instances for saving; and allowing said application logic for any row instance to modify other row object instances which are then not prepared, and so on until all row object instances are prepared for saving.

2. A software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, where field data selections may be specified with regard to a row object instance by means of textual or symbolic expression, the improvement comprising:

allowing said expressions to navigate to singly related row object instances from the previous row object instance, as many times as required, allowing registration of interest in the value of a persistent expression with regard to one or more row object instances by business logic, data display or other process, allowing the evaluation of such a persistent expression for resulting field or other data selection, detecting and localizing future data changes relating to a persistent expression, which affect either navigated relationships, final selected column, final selected row, or other relevant data, optimizing re-evaluation and notification of persistent expressions according to locality of future changes by determining relevant originating row objects, notifying the registered interest process of further changes which affect the navigational path, and notifying the registered interest process of future changes affecting the value or state of finally selected field data.

3. A software development and run-time framework for structured databases wherein data is stored in rows in each of a plurality of database tables and wherein a database connection established by a user allows selected row instances from the database to be opened by the user and copied to cache memory as row instances or object instances where said instances may be changed through an associated data display and editing form or batch data processing routine and the updated row instances subsequently saved to the database at the user's option, saving to said database being prevented if the selected row instances have been or are being updated by another user, wherein relationships between tables may be defined which determine the target set of related row instances for an originating row based on field value selections with regard to that originating row, and wherein future changes to field value selections are detected and affected relationships re-determined or notified for re-determination, the improvement comprising:

allowing said field value selection to be made by evaluating an expression with regard to the originating row instance, including expressions which involve the navigation of multiple relationships, and detecting future changes to said expression and optimizing updates by determining affected relationships.

4. A software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being prevented either at time of change or at time of save if the selected row object instances have been or are being updated by another user, where field or other data selections may be specified with regard to a row object instance by means of textual or symbolic expression, the improvement comprising:

allowing data selections for data display and edit controls to be specified by evaluating an expression with regard to a row instance, including expressions which involve the navigation of multiple relations, detecting future changes to the data selection or the value of the data selection, and responding to future changes by updating the control display.

5. A software development and run-time framework for structured databases wherein data is stored in rows in each of a plurality of database tables and wherein a database connection established by a user allows selected row object instances from the database to be opened by the user and copied to cache memory as row object instances or object instances where said instances may be changed through an associated data display and editing form or batch data processing routine and the updated row object instances subsequently saved to the database at the user's option, saving to said database being preventing either at time of change or at time of save if the selected row object instances have been or are being updated by another user, where field or other data selections may be specified with regard to a row object instance by means of textual or symbolic expression, the improvement comprising:

allowing application logic to be defined for row object instance or class, which logic may update field values or perform other data operations, initializing or executing said logic for each row object instance becoming active within the cache, allowing said logic to evaluate expressions with regard to the row object instance, which expressions may involve the navigation of multiple relationships, detecting future changes which affect expression navigation paths or final data selections and optimizing updates according to locality of changes, and responding to future changes by executing the application logic.

6. A structural database, database cache, local database, middleware or other data repository, where data is stored in rows, objects or corresponding entities, where data entities are related between entity types according to comparison of key field or attribute values, referencing of object identifiers, pointers or corresponding schema, and where field or attribute data selections may be specified with regard to a data entity by textual or symbolic expression, the improvement comprising:

allowing expressions to navigate to singly related data entities from the previous entity, as many times as required, allowing registration of interest in a persistent expression with regard to one or more data entities by business logic, data display or other process, allowing the evaluation of such a persistent expression, detecting and localizing future data changes with relevance to a persistent expression, optimizing and re-evaluation and notification of persistent expressions according to locality of changes by determining relevant originating data entities, notifying the registered interest process of changes which affect the navigational path, and notifying the registered interest process of changes affecting the value or state of finally selected field or attribute data.

7. A structured database, database cache, local database, middleware, or other data repository, wherein data is stored in rows, objects or corresponding entities, and wherein data entities are related between types according to comparison of key field or attribute values, referencing of object identifiers, pointers or corresponding schema, the improvement comprising:

allowing application logic to be defined for row object instance or class, initializing or executing said logic for each row object instance becoming active within the cache, allowing said logic to evaluate expressions with regard to the row object instance, which expressions may involve the navigation of multiple relationships, detecting future changes which affect expression navigation paths or final data selections and optimizing updates according to locality of changes, and responding to future changes by executing the application logic.

* * * * *

UNITED STATES PATENT AND TRADEMARK OFFICE
CERTIFICATE OF CORRECTION

PATENT NO. : 6,070,165
DATED : May 30, 2000
INVENTOR(S) : Thomas John Witmore

It is certified that error appears in the above-identified patent and that said Letters Patent is hereby corrected as shown below:

Claim 6,
Line 1, change "A structural database" to -- A structured database --.
Line 20, change "optimizing and re-evaluation and notification" tp -- optimizing re-evaluation and notification --.

Signed and Sealed this

Twentieth Day of November, 2001

Attest:

*Nicholas P. Godici*

NICHOLAS P. GODICI
*Attesting Officer*   *Acting Director of the United States Patent and Trademark Office*